United States Patent
Jones et al.

(10) Patent No.: US 7,796,624 B2
(45) Date of Patent: *Sep. 14, 2010

(54) SYSTEMS AND METHODS FOR PROVIDING SINGLE-PACKET AND MULTI-PACKET TRANSACTIONS IN AN INTEGRATED CIRCUIT

(75) Inventors: Andrew M. Jones, Bristol (GB); John A. Carey, Bristol (GB); Atsushi Hasegawa, Sunnyvale, CA (US)

(73) Assignee: STMicroelectronics Ltd., Bristol (GB)

( * ) Notice: Subject to any disclaimer, the term of this patent is extended or adjusted under 35 U.S.C. 154(b) by 1409 days.

This patent is subject to a terminal disclaimer.

(21) Appl. No.: 10/819,552

(22) Filed: Apr. 7, 2004

(65) Prior Publication Data

US 2004/0190466 A1    Sep. 30, 2004

Related U.S. Application Data

(63) Continuation of application No. 09/411,828, filed on Oct. 1, 1999, now Pat. No. 6,763,034.

(51) Int. Cl.
*H04L 12/28* (2006.01)
(52) U.S. Cl. .................. 370/412; 370/414; 370/418
(58) Field of Classification Search .......... 370/389, 370/422, 429, 415, 412, 414, 418; 709/237; 726/13; 710/312
See application file for complete search history.

(56) References Cited

U.S. PATENT DOCUMENTS

| 4,780,870 | A | * | 10/1988 | McHarg et al. | 370/415 |
|---|---|---|---|---|---|
| 4,897,874 | A | * | 1/1990 | Lidinsky et al. | 726/13 |
| 5,511,224 | A | | 4/1996 | Tran et al. | |
| 5,634,058 | A | | 5/1997 | Allen et al. | |
| 5,740,373 | A | * | 4/1998 | Isaka | 709/237 |
| 5,911,051 | A | * | 6/1999 | Carson et al. | 710/107 |
| 6,098,134 | A | * | 8/2000 | Michels et al. | 710/108 |
| 6,170,025 | B1 | * | 1/2001 | Drottar et al. | 710/48 |
| 6,175,889 | B1 | * | 1/2001 | Olarig | 710/309 |
| 6,330,630 | B1 | * | 12/2001 | Bell | 710/312 |
| 6,389,498 | B1 | | 5/2002 | Edwards et al. | |
| 6,397,325 | B1 | | 5/2002 | Jones et al. | |
| 6,412,047 | B2 | | 6/2002 | Shimizu et al. | |
| 6,516,366 | B1 | * | 2/2003 | Gates et al. | 710/105 |
| 6,763,034 | B1 | * | 7/2004 | Jones et al. | 370/463 |

* cited by examiner

*Primary Examiner*—Jason E Mattis
(74) *Attorney, Agent, or Firm*—Lisa K. Jorgenson; William J. Kubida

(57) ABSTRACT

Connection ports for interconnecting functional modules in an integrated circuit are described. The connection ports provide enhanced functionality based around a common port primitive. This simplifies port design and selection and also allows a common packet protocol to be used for communication of packets across the packet router. In particular, there is improved functionality of target ports which allow out of order requests to be dealt with and out of order responses to be generated.

14 Claims, 13 Drawing Sheets

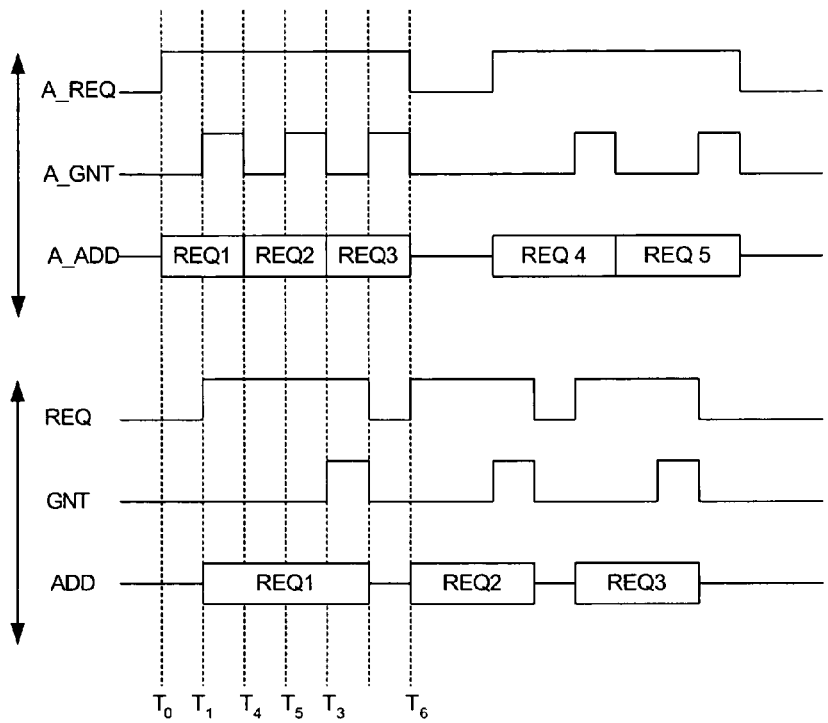
*Figure 13b*
*Figure 13a*
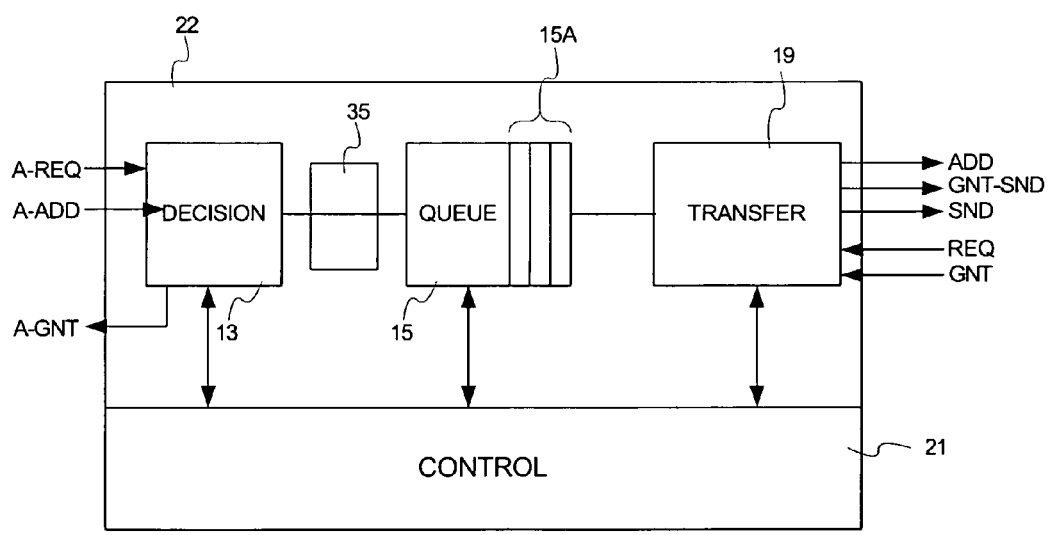
*Figure 12*

SYSTEMS AND METHODS FOR PROVIDING SINGLE-PACKET AND MULTI-PACKET TRANSACTIONS IN AN INTEGRATED CIRCUIT

RELATED APPLICATIONS

The present invention is a continuation of U.S. patent application Ser. No. 09/411,828 entitled CONNECTION PORTS FOR INTERCONNECTING MODULES IN AN INTEGRATED CIRCUIT, which was filed on Oct. 1, 1999, now U.S. Pat. No. 6,763,034 which is incorporated herein by reference.

FIELD OF THE INVENTION

The present invention relates to connection ports for interconnecting functional modules in an integrated circuit. In particular the present invention relates to connection ports for interconnecting respective functional modules to a packet router in an integrated circuit.

BACKGROUND OF THE INVENTION

Computer systems and integrated circuit processors exist which implement transactions with the dispatch and receipt of packets. Request packets define an operation to be performed and response packets indicate that a request has been received and whether or not the operation defined in the request packet has been successfully carried out. The integrated circuit processor can comprise a plurality of functional modules connected to a packet router for transmitting and receiving the request and response packets. Each functional module is connected to the packet router via a respective port. The increasing ability to incorporate a greater number of more complex modules on a single chip means that it is now possible to integrate a high performance CPU with a number of complex modules using a high performance bus in a system on a chip. Generally, the design process is such that the architecture of a processor is designed and the functional modules which are required are determined. Then, ports have to be designed for the functional modules to connect the functional modules to a packet router of the integrated circuit.

The complexity of the port depends on the complexity and functionality of the functional module which is to be attached to the packet router by the port. In principle therefore it is either necessary to design a port to match the functionality of each functional module, or to constrain the functional modules which can be connected to a packet router by the ports which have been designed.

It is an aim of the present invention to provide connection ports with enhanced functionality which are preferably based around a common port primitive. This simplifies port design and selection and also allows the common packet protocol to be used for communication of packets across the packet router.

SUMMARY OF THE INVENTION

According to a first aspect of the invention there is provided a target port for a functional module in an integrated circuit system, the target port comprising: an input buffer for holding a plurality of request packets received from a packet router of the integrated circuit system; control circuitry for selecting a request packet held in said input buffer for supply to the functional module to implement the operation defined in the request packet; and an output buffer for holding a plurality of response packets, each response packet being generated by the functional module responsive to receipt of a request packet; wherein each request packet includes an indicator of the source of the packet and a transaction identifier uniquely identifying the transaction in which the packet is engaged and wherein said response packets use the source identifier as a destination indicator for identifying the destination of the response packet, and also convey said unique transaction identifier.

Thus, initiators can dispatch requests to implement a series of transactions without having to wait for the first transaction to be completed before dispatching a request for the next transaction. This ability to implement out of order transactions can significantly improve the performance of the system.

The control circuitry can be arranged to determine whether a request packet formulated by the functional module forms part of a simple transaction involving a single request packet or a compound transaction involving a plurality of request packets and, in the case of a compound transaction, cause a lock signal to be supplied for all request packets involved in the compound transaction save the last packet, said lock signal being supplied on signal lines in both said first and second group.

The lock signal can be used by the system control unit to control arbitration of packets on a packet router so that all request packets involved in a compound transaction can be conveyed in an uninterrupted fashion. The transfer of the lock signal on the signal lines conveying packet information from the initiator port allows the lock signal to be conveyed to a target module to advise the target module that an uninterrupted sequence of request packets is to be transmitted.

Priority information conveyed with the request packet can be copied into the response packet.

The control circuitry can be operable to generate a transfer request signal a destination indicator to request transfer of a packet from the initiator port onto the packet router.

The port can include packet framing circuitry for generating an end of packet signal to be conveyed on the first group of outgoing signal lines. It is possible however for such packet framing circuitry to form part of the functional module to which the port is connected such that the port conveys the end of packet information by a "dumb" wire.

According to the described packet protocol each request packet includes an opcode field identifying an operation to be performed by the transaction.

Another aspect of the invention provides an integrated circuit system comprising: a plurality of initiator functional modules; a plurality of target functional modules; a packet router to which said plurality of initiator functional modules and target functional modules are connected via respective initiator ports and target ports; wherein each initiator module is operable to generate a sequence of requests relating to respective transactions without waiting for a response to a first request in the sequence before issuing a subsequent request in the sequence and wherein each target port comprises an input buffer for queuing a sequence of incoming requests received from the packet router from said initiator modules and control circuitry for selecting requests from the input buffer for implementation by the attached functional module, the target functional module being operable to generate a response each time a request has been handled by the target functional module.

Another aspect of the invention provides a target port for connecting a target functional module to a packet router, the target port comprising: a first group of incoming signal lines for receiving packet information from the packet router; a second group of outgoing signal lines for conveying control signals from the port to a system control unit; a third group of outgoing signal lines for conveying packet information from the target functional module to the packet router, wherein said first group includes a signal line conveying a lock signal indicating that a request packet conveyed by the first group of signal lines forms part of a compound transaction involving a plurality of request packets, the target port further comprising: control circuitry responsive to receipt of said lock signal to generate a response lock signal when a response packet is conveyed responsive to a request packet in which the lock signal was set.

The packet information can include an opcode field which, for a response packet, distinguishes between an ordinary response and an error response. An ordinary response is conveyed when the requested operation has been effected. An error response is conveyed when the requested operation cannot be effected by the target functional module.

A further aspect of the present invention provides a target port for connecting a target functional module to a packet router, the target port comprising: a first group of incoming signal lines for conveying packet information from the packet router to the target functional module; a second group of outgoing signal lines for conveying control signals from the port to a system control unit; a third group of outgoing signal lines for conveying packet information to the packet router; and control circuitry operable to generate a priority signal to be conveyed by signal lines in the second and third group, said priority signal relating to a response packet corresponding to a request packet received on the first group of signal lines and matching the priority in said request packet.

Thus, this allows response packets to be tagged with the same priority as incoming request packets.

A further aspect of the invention provides an advanced arbitration port for connecting a functional module to a packet router, the port comprising: a first group of outgoing signal lines for conveying packet information from the functional module to the packet router; a second group of outgoing signal lines for conveying control signals from the port to a system control unit; a third group of incoming signal lines for receiving packet information from the packet router; and arbitration request circuitry for generating an arbitration request to be conveyed by said second group of outgoing signal lines and to generate a subsequent transfer request to be conveyed by said second group of outgoing signal lines.

The port can be an initiator port for conveying request packets onto the packet router or a target port for conveying request packets from the packet router to the attached target functional module.

A port can combine the advanced features as herein above defined in a manner to suit the complexity of the functional modules attached to the port. Thus, a port can be an advanced arbitration port also utilizing the lock and priority signals.

For a better understanding of the present invention and to show how the same may be carried into effect reference will now be made by way of example to the accompanying drawings.

BRIEF DESCRIPTION OF THE DRAWINGS

FIG. 12 is a schematic block diagram of an arbitration unit; and

FIG. 13 is the timing diagram for the arbitration unit.

DESCRIPTION OF THE PREFERRED EMBODIMENT

Figure 1:
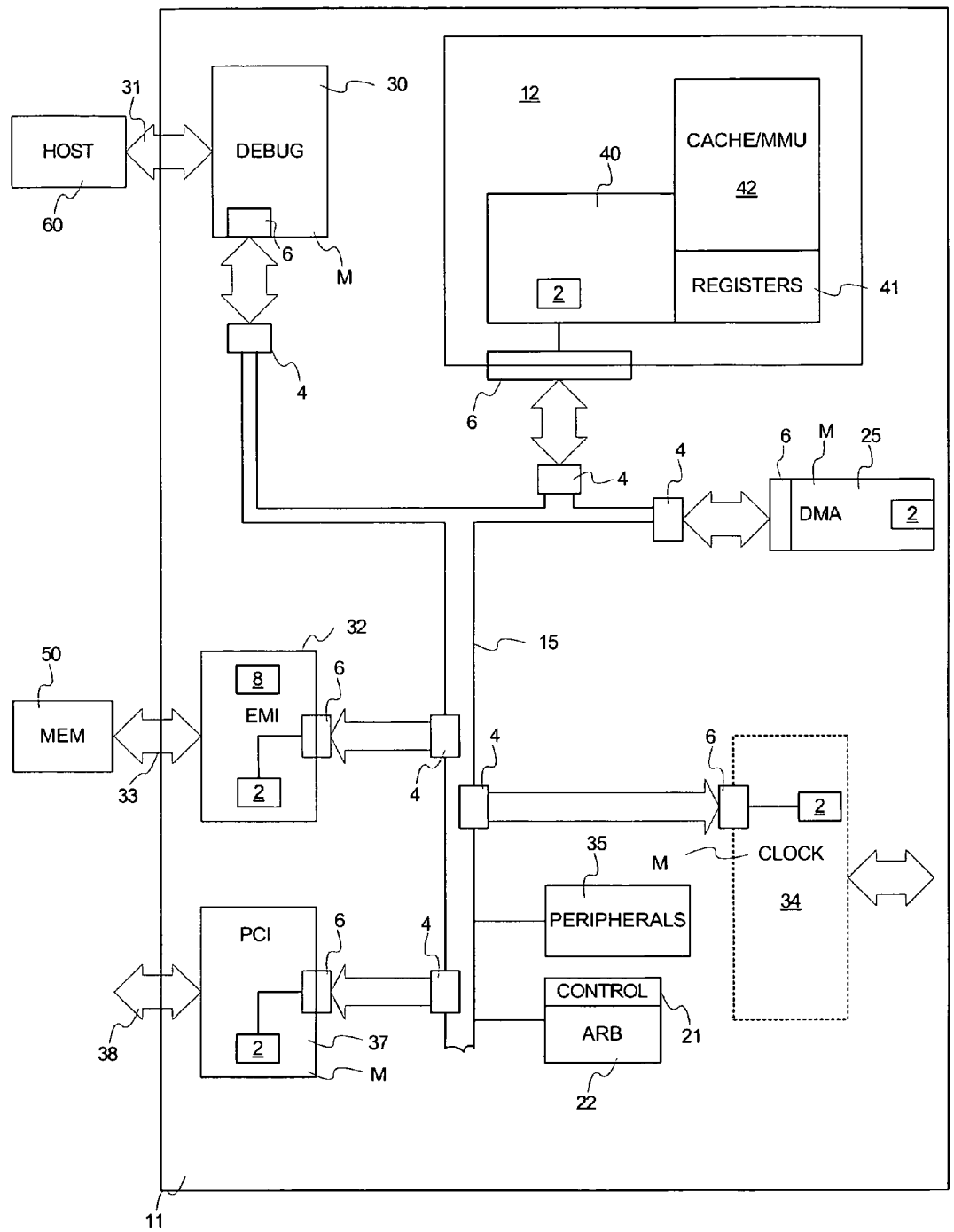
FIG. 1 is a block diagram of a processor embodied as an integrated circuit with an external memory.

FIG. 1 illustrates an integrated circuit according to an embodiment of the invention. On each chip 11 a CPU unit 12 is connected to a plurality of modules M by a data and address path 15 arranged to carry bit packets in parallel form. The modules as well as the CPU unit 12 each include packet handling circuitry 2 used in the generation and receipt of bit packets on the path 15. The path 15 is referred to herein as a packet router or routing bus. Two main types of packet are used on the data and address path 15, each including a destination indicator or address to indicate the required destination module connected to the path 15. The packets include request packets which are generated by an initiator module and response packets which are generated by a target module. A module may act as both an initiator and a target. Response packets are of two types, ordinary responses or error responses. These are discussed in more detail later. The modules M as well as the CPU unit 12 each have packet handling circuitry 2 for handling packet formation and receipt of requests, ordinary responses and error responses.

The routing bus 15 provides bi-directional connections to each module. In this example the bus consists of parallel request and response buses and a dedicated control bus provided respectively for each module so as to link the modules to an arbitration unit 22. Each module is connected to the routing bus via a port 4 and is provided with an interface 6 incorporating a state machine so as to interchange control signals and data between the port 4 and the interface 6.

Figure 1A:
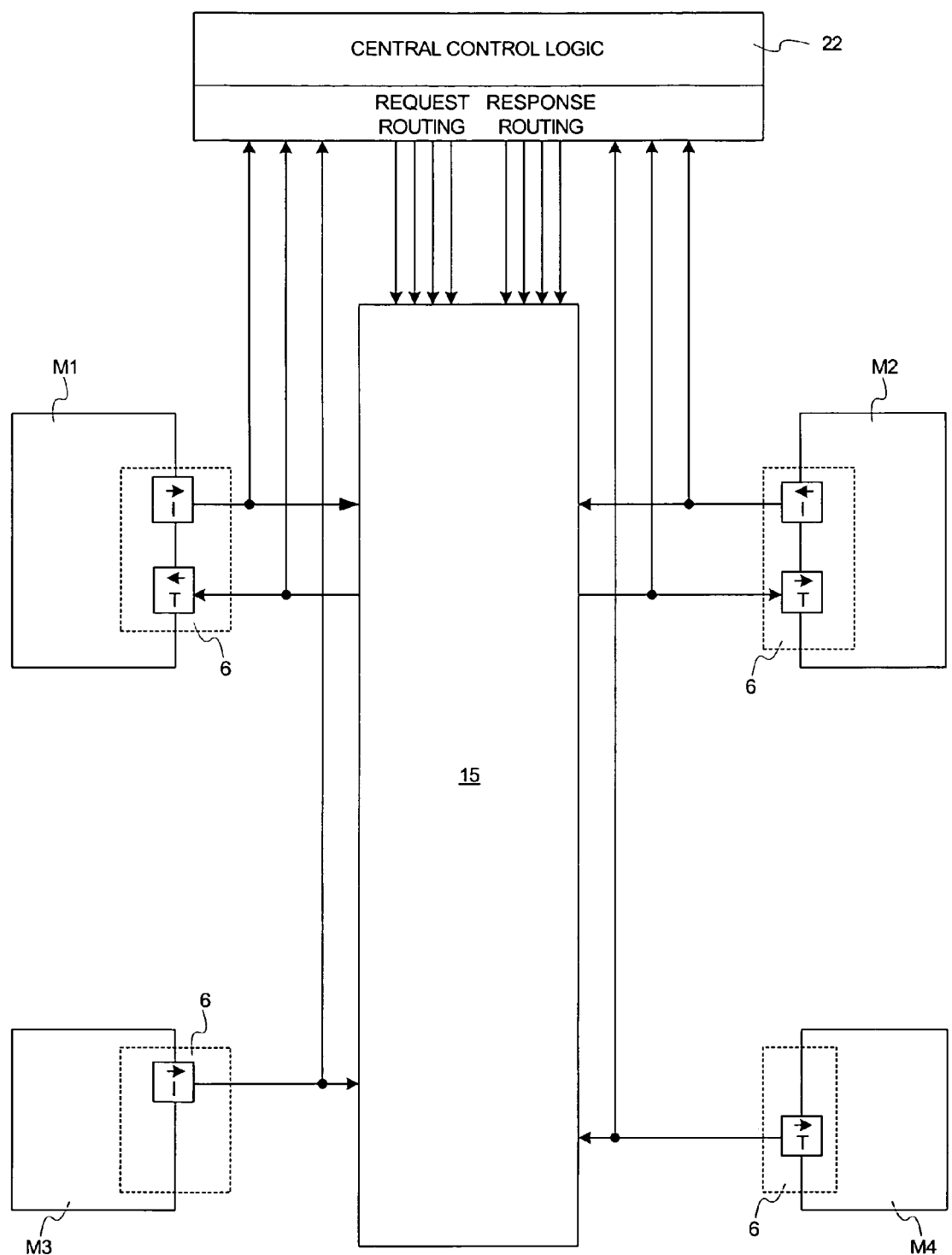
FIG. 1A is a block diagram illustrating initiator and target modules.

FIG. 1A is a block diagram illustrating relevant functional components of the chip of FIG. 1 to illustrate the concept of targets and initiator modules. The modules are labeled M1, M2, M3 and M4 and may include any of the modules M already described with reference to FIG. 1. Modules M1 and M2 both have target and initiator functions as illustrated by the separate target and initiator parts of the interface 6 of each module. Module M3 acts only as an initiator and module M4 acts only as a target. Signals from the interfaces 6 are supplied to central control logic which forms part of the arbitration unit 22. The arbitration unit 22 issues request routing controls and response routing controls to the routing bus network 15. Each part of the interface 6 (initiator and target) is connected to the packet router 15 by a respective port.

In the example shown in FIG. 1, the various modules M include a debug module 30 which includes an external link 31 for transmitting packets across the chip boundary, an external memory interface EMI 32 having an external bus connection 33 leading to an external memory 50, clock circuitry 34, various peripheral interfaces 35, a peripheral component interface PCI 37 with an external connection 38, a DMA unit 25 for effecting memory accesses as well as the arbitration unit 22. The CPU unit 12 includes a plurality of instruction execution units 40, a plurality of registers 41, and a cache 42. The CPU unit 12 also includes packet handling circuitry 2 connected to the execution units 40. The routing bus 15 is arranged to transmit to the modules M both request and response packets for effecting memory access transactions as discussed further herein. These packets may be generated by software as a result of instruction execution by a CPU or by hardware responsive to detection of a packet. The packets may be generated on-chip and distributed on the bus 15 or generated off-chip and supplied to the on-chip bus 15 through an external connection such as the link 31 associated with the debug module 30.

The CPU can be operated in a conventional manner receiving instructions from a program memory and effecting data read or write operations with the cache 42 on-chip. Additionally external memory accesses for read or write operations may be made through the external memory interface 32 and bus connection 33 to the external memory 50.

The debug module 30 provides an important external communication which may be used for example in debugging procedures. The on-chip CPU 12 may obtain instruction code (by memory access packets) for execution from an external source such as a debugging host 60 communicating through the link 31. Communications on the routing bus 15 are carried out in bit parallel format. It is possible to reduce the parallelism of packets obtained from the routing bus 15 so that they are output in bit serial format through the link 31.

Each packet is constructed from a series of cells or tokens, the end of the packet being identified by an end of packet (eop) signal. The construction of the cells is discussed in more detail later. Briefly, each packet cell comprises a number of fields which characterize the packet. Each packet is transmitted by a source module and is directed to a destination module. An initiator can issue request packets and act on response packets. A target can receive and act on requests and issue responses. Thus, a source module may be an initiator or a target depending on the nature of the packet. The source module uses its appropriate port 4 to transmit a packet onto the routing bus 15. The routing bus 15 arranges for the packet to be routed to the appropriate port associated with the destination module. The destination module then receives that packet from its associated port. The source and destination modules can be the same.

Figure 2:
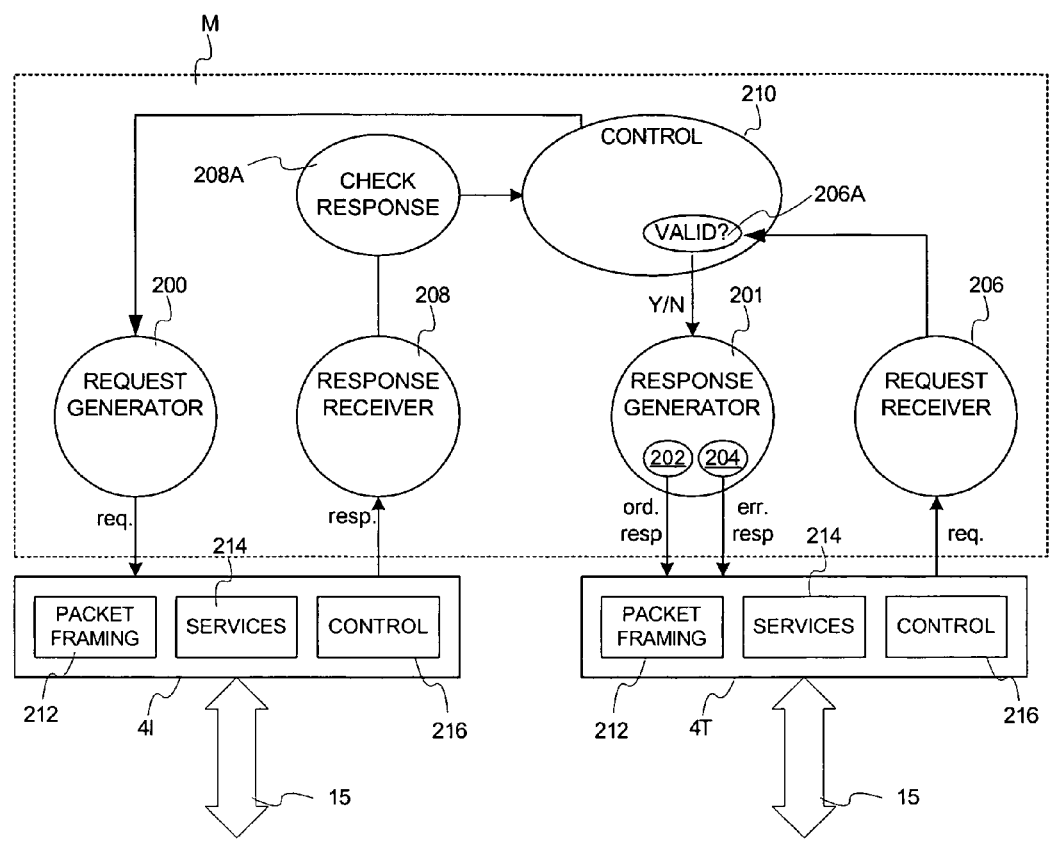
FIG. 2 shows the packet handling logic.

A transaction is an exchange of packets that allows a module to access the state of another module. A transaction consists of the transfer of a request packet from a source module to a destination module, followed by the transfer of a response packet from that destination module (now acting as a responding module) back to the source module which made the original request. The request packet initiates a transaction and its contents determine the access to be made. The response packet completes the transaction and its contents indicate the result of the access. A response packet also indicates whether the request was valid or not. If the request was valid, a so-called ordinary response packet is sent. If the request was invalid, an error response packet is transmitted. Some modules act only as initiators and thus their packet handling circuitry 2 is capable only of the generation of request packets. Some modules act only as targets, and therefore their packet handling circuitry 2 is capable only of generating response packets. In that case, both ordinary responses and error responses can be generated. However, some modules are capable of acting both as initiators or as targets, and their packet handling circuitry is capable of generating both request and response type packets. A logic diagram for the relevant parts of a module capable of both these functions is shown in FIG. 2. The packet handler 2 comprises request generator logic 200, ordinary response generator logic 202, error response generator logic 204, request packet receiver logic 206, and response packet receiver logic 208. These are all under the general functional control of a control logic block 210. A request packet is constructed by a requesting module when that module needs to make an access to a particular target module. As discussed more fully later, the address of the target module is recorded in the request packet destination field. The requesting module acts as a source of the request packet and sends that packet into the routing bus 15. The routing bus 15 arranges for that request packet to be routed from its source to its destination. The destination receives the request packet from the routing bus 15. The request packet receiver logic 206 checks whether or not the request is valid at 206a. If it is valid, an ordinary response packet is generated by the ordinary response generator logic 202 and the module services the requested access according to the information in the received request packet. If the request is not valid, the error response generator logic 204 generates an error response packet.

A response packet (ordinary or error) is constructed in order to reply to the request packet. The module which originated the request packet is recorded in the response packet's destination field. The responding module is the source of the response packet and sends that packet onto the routing bus 15. The response receiver logic 208 receives the response packet from the routing bus 15 and checks the response at 208a. If the response can be matched to the original request, the transaction is completed.

FIG. 2 also shows the logical arrangements of the target and initiator ports $4_T$, $4_I$ associated with the packet handling circuitry of the functional module. Each port comprises packet framing logic 212, a service block 214 and a control block 216. The function of these blocks will be described in more detail later. Briefly, the packet framing logic receives packet data from the packet handling circuitry of the module and frames it ready for dispatch onto the packet router 15. The services block 214 deals with the services requirements for the port, such as clock signal arrangements. This is under the overall control of a system control unit labeled 21 in FIG. 1. The control block 216 deals with requests and grants from the arbitration unit 22 for controlling the flow of packets to and from the packet router 15.

Figure 2A:
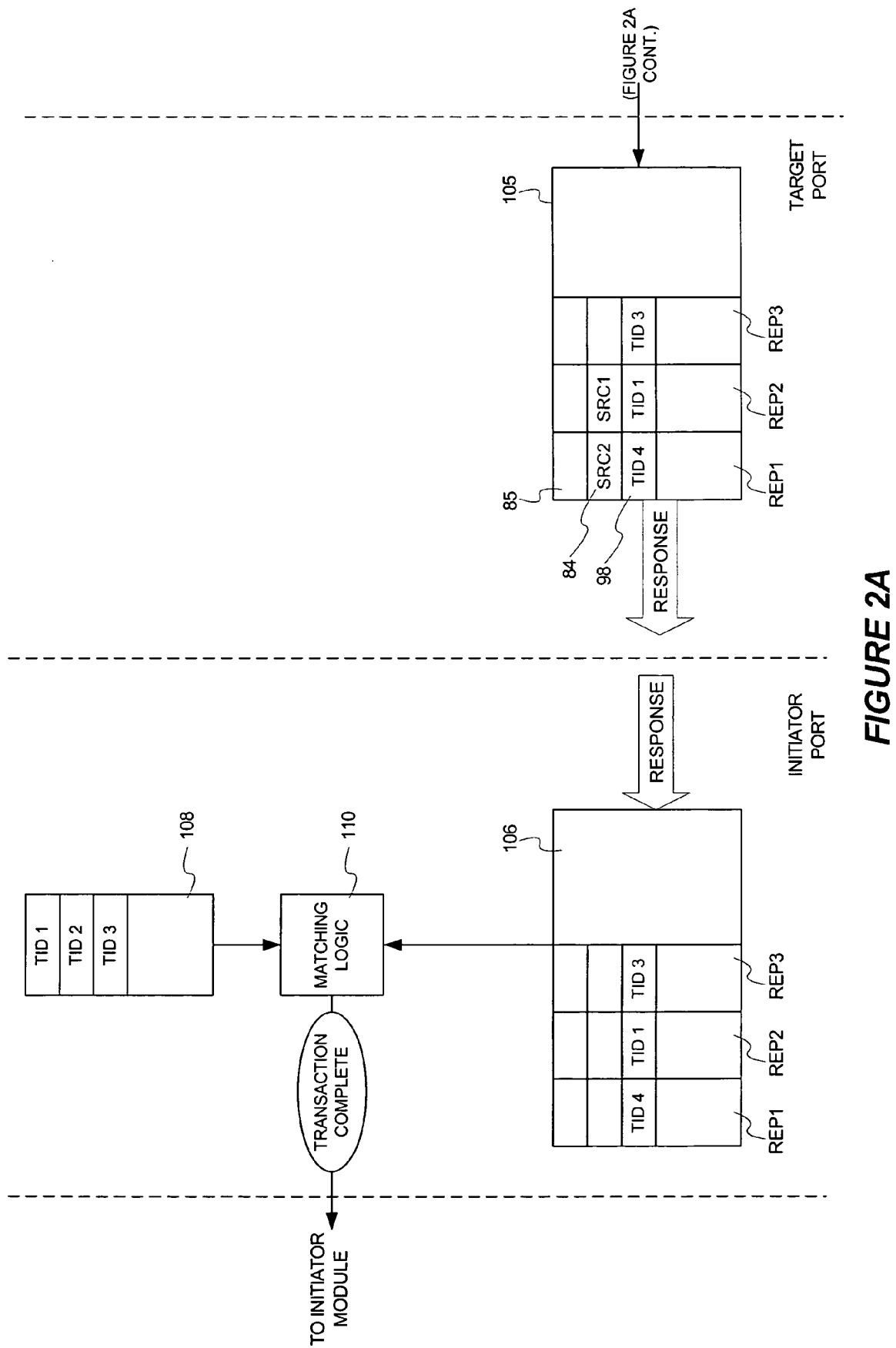
FIG. 2A is a schematic diagram illustrating out of order operation.
Figure 2A:
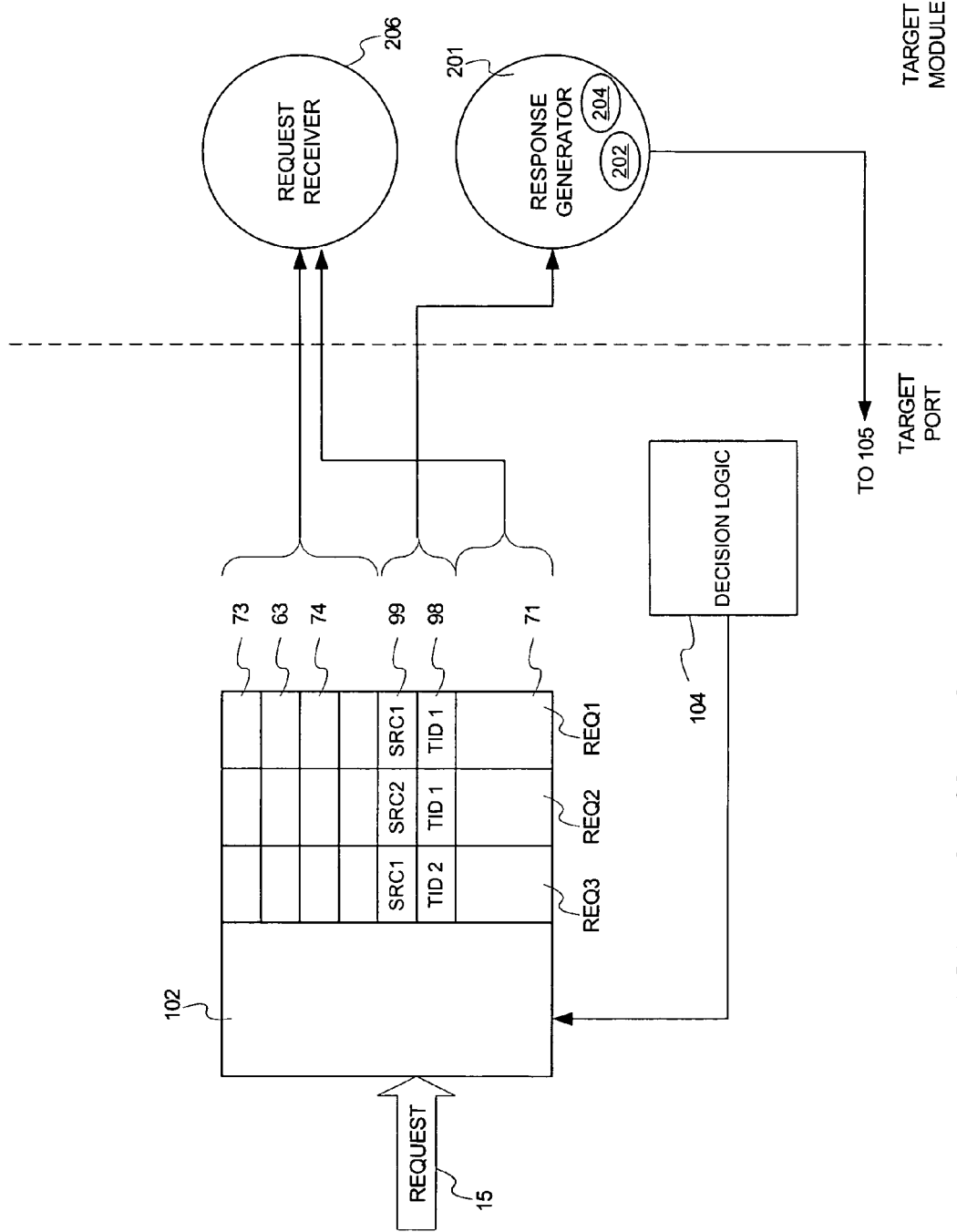

As will now be described with reference to FIG. 2A, the control block 216 of the port also allows out of order transaction operations to be implemented. The control block 216 of a target port comprises a request packet queue buffer 102 which allows a plurality of incoming requests on the bus 15 to be queued. Three such requests are shown in FIG. 2A labeled REQ1, REQ2 and REQ3. Requests 1 and 3 were sent from initiator module 1 and request 2 was sent from initiator module 2. For the sake of the present example, initiator module 1 is module M1 in FIG. 1A, and initiator module 2 is module M2 in FIG. 1A. The request packet queue buffer 102 holds all the fields of a request packet, including the source field 99 and the transaction field 98. In this case, src1 denotes initiator module 1, and scr2 denotes initiator module 2. The transaction field holds a transaction identifier which numbers the transactions. In this case, it is assumed that requests 1 and 2 are the first transactions from the modules M1, M2 respectively, and request 3 is the second transaction from initiator module 1. The port comprises decision logic 104 which is connected to the request packet buffer 102 and determines which of the queued requests should next be supplied to the functional module. This decision can be made according to user defined requirements. When a particular incoming request has been selected by the decision logic 104, the fields of that request are supplied to the functional module. The destination field 73, address field 63, opcode field 74, mask field and data field 71 are supplied to the request receiver logic 206 for implementing the operation defined in the packet. The source field 99 and transaction field 98 are supplied to the response generator logic 201 for generating error responses or ordinary responses. The target port also includes a response output buffer (decision logic) 104. That buffer allows output responses to be queued in the order in which they are generated by the response generator. In this example, it is assumed that request 2 is dealt with before request 1. The responses are labeled in FIG. 2A as rep1, rep2 and rep3, although notice that response 1 does not respond to request 1, but to request 2. This can readily be seen by the source field and transaction field of the packet. Thus, requests can be dealt with out of order, and responses are generated once a request has been dealt with. Therefore, responses can also be generated out of order. Each request is uniquely identified by its transaction number and source field. Likewise, each response uses the source field as its destination indicator and is uniquely identified by its transaction number.

On the initiator module side, the initiator module is used as an illustrative example in FIG. 2A. The port includes a response input queue 106 which holds responses in the order in which they are received by the port. The port also has a list 108 of transaction identifiers which were associated with requests dispatched from the port. Matching logic 110 compares the transaction identifiers of incoming responses queued in the input buffer 106 with transaction identifiers in the list 108. When there is a match, the transaction is considered to be complete and a signal is sent accordingly to the initiator module.

Figure 3:
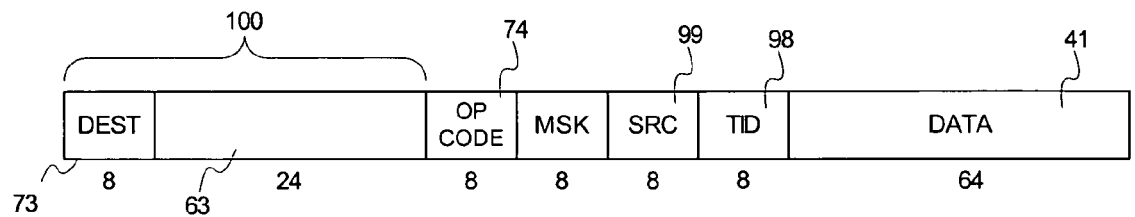
FIGS. 3 and 4 are packet formats of request and response packets respectively conveyed by the packet router.
Figure 4:
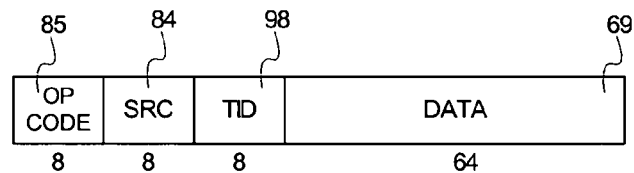

The format of the multibit packets used on the routing bus 15 in the microcomputer are illustrated by way of example in FIGS. 3 and 4. FIG. 3 shows the information carried by each request cell.

Each packet is constructed from a series of cells framed using an end of packet (eop) signal (generated by the packet framing logic 212 shown in FIG. 2). Each request cell comprises a 32-bit address field which indicates the destination address of the packet. In the described embodiment, an address comprises an 8-bit destination field 73 followed by a 24-bit offset field 63 which identifies a memory location within the destination. The offset information is present in request packets to identify the particular memory location at which the request is targeted. The destination field 73 is a 1-byte field used to route the packet to the destination or target module. In the following, dest or add <31:24> labels the field 73 and a_add labels the field 63. The signal add denotes the entire address field 100. A byte 74 conveys the opcode which identifies the nature of the requested access. For example, the opcode can define a load word access for reading a register value and a store word access for writing a register value. A SRC byte 99 is a source field which identifies the source module and which is used as a return address for a response packet. A transaction field byte 98 conveys a unique transaction number tid which is used by the requester to associate responses with requests. The transaction number enables a module to identify response packets corresponding to respective request packets in cases where a plurality of request packets have been sent before response packets have been received for each request packet. As discussed in more detail later, the transaction field 98 also holds transaction attributes describing the transaction to the system, including priority, pri and lock, lck. A 64-bit data field 41 holds data to be conveyed with the request.

FIG. 4 illustrates the construction of a response packet cell. If the response packet contains more information than a single cell, it is constructed from a sequence of cells framed using a response end of packet (r_eop) signal. The response packet includes an opcode byte 85 which denotes the nature of the requested transaction, a byte 84 which identifies the source module of the requesting packet which gave rise to the response and which acts as the return address for the response packet, a transaction field byte 98 and a data field 69. The transaction field byte of a response packet holds a copy of the transaction field byte 98 of the corresponding request packet.

The packet protocol support illustrated in FIGS. 3 and 4 supports operation of a number of different types of functional modules. Functional modules may have different levels of complexity according to the functions which they are required to perform. Similarly, the ports 4 associated with those modules may also be of differing levels of complexity depending on the functionality of the functional module to which the port is connected. In the embodiment of the invention described herein there are four types of port which are labeled Type I, Type II, Type III and Type IV. In the diagram of FIG. 1 the type of port 4 associated with each module depends on the nature of the attached module.

The types of port differ in the signals which they support from the simplest port Type I to the most advanced port Type IV.

Figure 5:
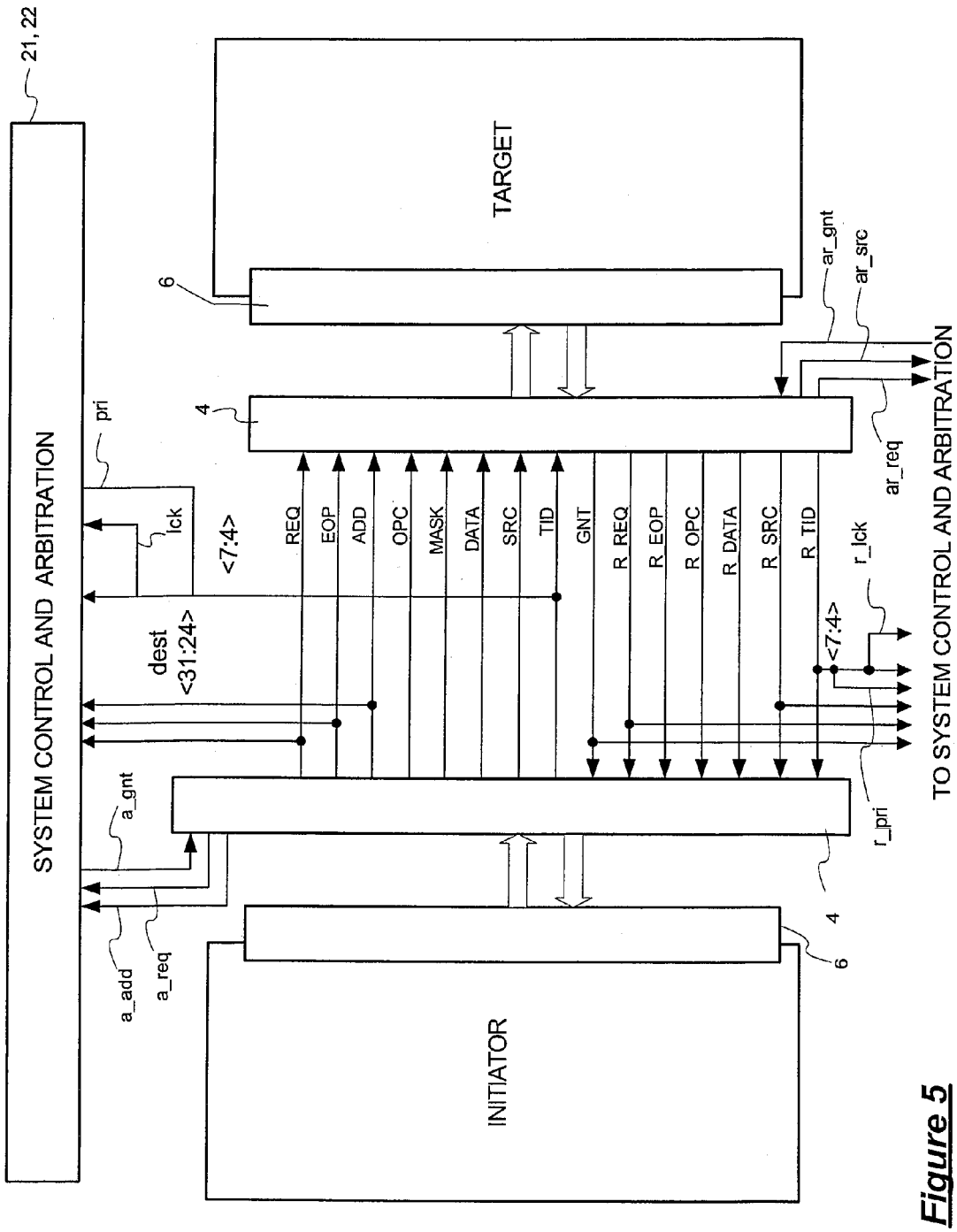
FIG. 5 is a block diagram more clearly illustrating the routing control signals.

FIG. 5 illustrates the full set of signals which are supported by the most advanced port Type IV. In the diagram of FIG. 5, each line is marked with a signal name. These signal names are used in the following to denote the signals carried by appropriate wires, without reference numerals for the sake of clarity of the diagram of FIG. 5. The same signal names are used in the following Figures. Some of the signals are generated by logic in the port, while other signals are generated from fields in the packets which are formed by the packet handling circuitry of each module.

In the initiator module, the request generator logic formulates a request packet as described earlier which causes the following signals to be generated:

address, add opcode, opc mask, en (short for byte enable)

data, transaction identifier, tid source identifier, src lock, lck and priority, pri.

The initiator port generates the packet framing (eop) signals and arbitration request signals a_add and a_req.

In addition, the initiator module receives the following signals. A response end of packet signal r_eop is handled by the port 4 as is the arbitration grant signal gnt, a_gnt. The response receiver logic 208 of the initiator module receives the following response packet signals r_opc, r_data, r_src, r_tid.

In the target module, the response generator logic formulates a response packet which causes the following signals to be generated:

r_opc, r_data, r_src and r_tid.

The transaction identifier in the response packet causes the response lock r_lck and response priority r_pri signals to be generated. The target port issues response arbitration request signals ar_req, ar_src and handles response arbitration grant signals ar_gnt. Moreover, it is responsible for issuing the grant signal gnt and the response request signal r_req.

The function of these signals and how they are derived from the packet fields is discussed below.

request (req)

Ready to send data. This is driven by an initiator module IM and is used to indicate that it is ready to transfer a request or element of a request across the interface. If this signal is asserted the request content and framing signals are valid. The req signal is routed via the packet router 15 to the target module and via a control bus to the arbitration unit 22.

Initiators indicate they have data to send by asserting a request and expect a grant in this or subsequent cycles to complete the transfer.

grant (gnt)

Ready to accept data. This is driven by a target module TM and is used by the target to indicate it is ready to accept data. A data or cell transfer across the interface occurs when the initiator is ready to send and the target is ready to accept, i.e. both request and grant are asserted at a rising clock edge.

Targets indicate they are able to accept data by asserting a grant and expect a request in this or subsequent cycles to complete the transfer. The gnt signal is conveyed to the source module and the arbitration unit 22.

end of packet (eop)

Final cell of packet. This is driven by the initiator port and indicates this is the final cell of a request packet.

lock (lck)

Transaction lock. This indicates to the system that this transaction is made up of more than one request/response pairs. It acts as a general mechanism to link two or more request packets to make a linked compound operation. Depending on the implementation of the system the lock signal can be derived from the opcode. The lock signal is supplied by the initiator port to the arbitration unit 22.

address (add)

The transaction target address. This is the address of the target module, and the location within the target module at which the operation will occur. The top 8 bits, dest, are supplied to the arbitration unit 22 with the a_req signal. The whole address is supplied with a transfer request req signal.

opcode (opc)

Defines the operation associated with the transaction. This defines the transaction operation. It is not generally interpreted by the interconnect or transport medium. The opcode information remains constant across all request cells associated with the transaction.

Compound operations may be built from multiple request/response packets linked via the lock mechanism.

mask (en)

Defines the bytes within the cell on which the target should complete the operation. Mask<0> is associated with data<7: 0>, and so forth to the most significant byte.

data

Defines the data being carried with the cell. The data field is made up of a set of byte quantities, each byte being associated uniquely with a specific mask bit. Each byte is organized as a bit little endian quantity. The data field may contain multiple bytes; these are organized in a byte significant manner. Data quantities larger than the natural bus width are always sent using incrementing addresses, with the address wrapping at the 2" boundary associated with that data quantity.

source (src)

Source identifier. This identifies the source of the transactions to the system. It allows the system (and target modules) to associate a series of transactions with a specific source of data.

identifier (tid)

Defines the transaction identifier. This signal allows each transaction to be uniquely labeled. The transaction identifier of a request is used in the associated response.

priority (pri)

Defines the transaction priority. This bit labels the transaction with an urgency level which the system interconnect may use to implement preferential arbitration and/or overtaking. It is used to implement system performance enhancements. It is implemented in both the request packet and its associated response packet.

response request (r req)

Indicates a response cell is available. An initiator should only commence a transfer if it is ready to accept the response packet.

response grant (r ant)

Indicates a response cell may be accepted.

response lock (r lck)

Transaction lock. This indicates to the system that this transaction is made up of one or more than one request/response pairs. It acts as a general mechanism to link two or more response packets to make a compound operation.

response opcode (r opc)

Information about the response being presented to the initiator. That is, whether the operation was successful (ordinary response) or an error arose (error response).

response data (r data)

Defines the data being carried with the response cell. A response packet will contain as many response cells as is required to build a response packet to transfer the number of words required by the transaction.

response source (r src)

A copy of the source identification field used for the destination indicator in the response packet.

response identifier (r tid)

A copy of the transaction field. These fields allow the response cell packet to be identified within a system enabling performance optimization and observability of transactions within the system. The encoding of these fields corresponds to that of the associated request fields. In the described embodiment it allows r_pri and r_lck to be generated.

response priority (r pri)

Defines the transaction priority. This field labels the response information with an urgency level which the system interconnect may use to implement preferential arbitration. This is a copy of the priority bit of the request packet.

next request (a req)

The module is ready to start the next or subsequent request packet.

next grant (a gnt)

The system will be ready to accept the next or subsequent request packet on completion of the current packet.

next address (a add)

The address of the target module for the next or subsequent request, being the dest byte 73 of FIG. 3.

next response request (ar req)

The module is ready to start the next or subsequent response packet.

next response grant (ar gnt)

The system is able to accept the next or subsequent response on completion of the current.

next response source (ar src)

The destination of the next or subsequent response packet, being the SRC byte 99 of FIG. 3.

The latter six signals (a_req, a_gnt, a_add, ar_req, ar_gnt, ar_src) are used to create a path from the module to the arbitration unit 22 which allows information on a later transfer to be dealt with whilst the current transfer is being implemented.

It will be appreciated from the above that some of the signals generated across the routing bus 15 by the initiator and target modules IM, TM are supplied to the arbitration unit 22 to implement control of packet flow on the bus 15. Other signals are supplied directly from the initiator module to the destination target module. They have no function in the routing control itself.

Figure 6:
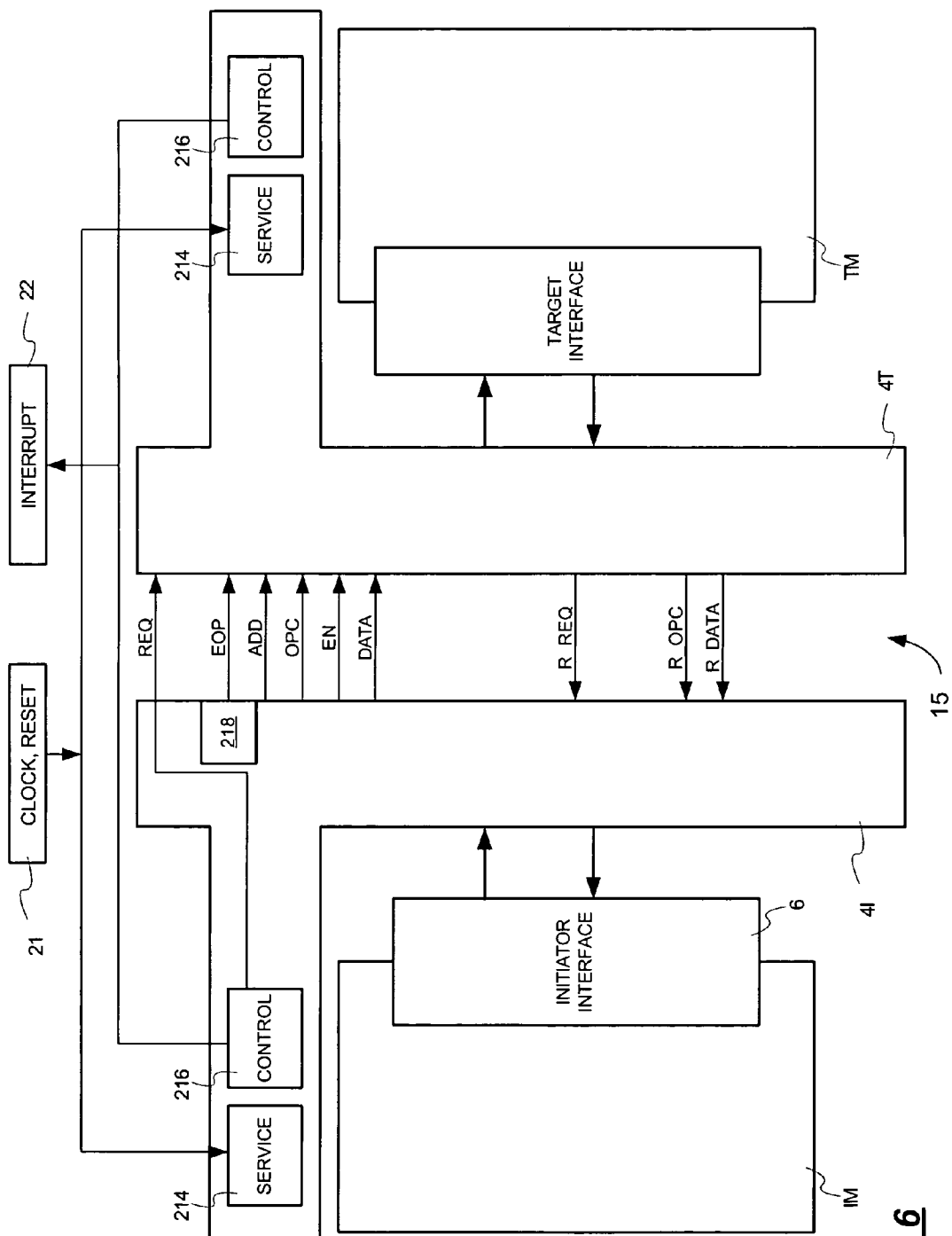
FIGS. 6-9 illustrate respectively ports of different types I to IV.

FIGS. 6 through 9 illustrate different types of ports. FIG. 6 illustrates a Type I port which represents a simple design, low-cost port for low or medium performance functional modules.

Figure 7:
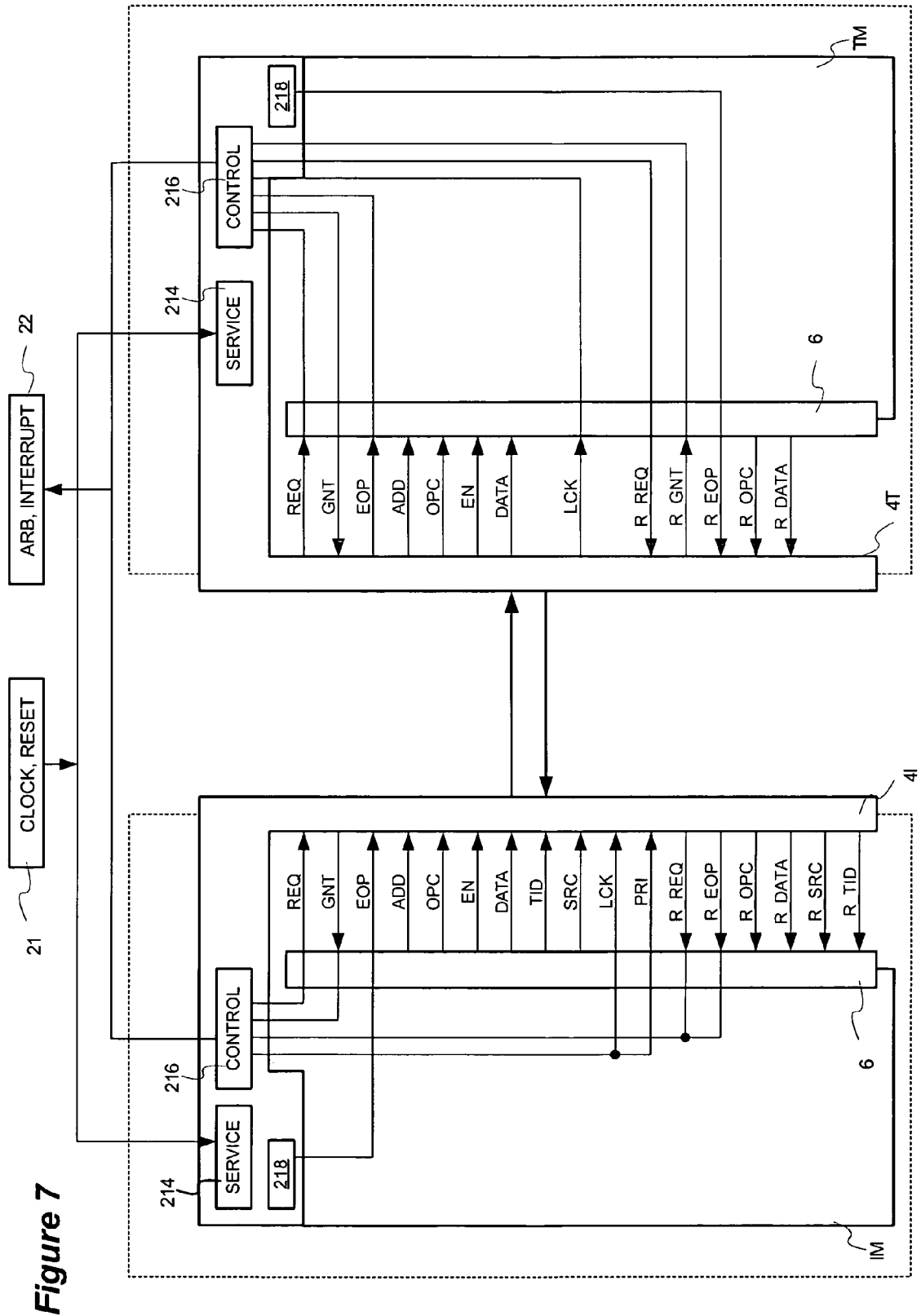

FIG. 7 illustrates a Type II port which provides support for split transactions and additional functionality as indicated by the signals illustrated in FIG. 7 and described above. In particular, the Type II initiator port supports grouped request packets by implementation of the lock signal and priority arbitration mechanisms by implementation of the priority signal, pri.

Figure 8:
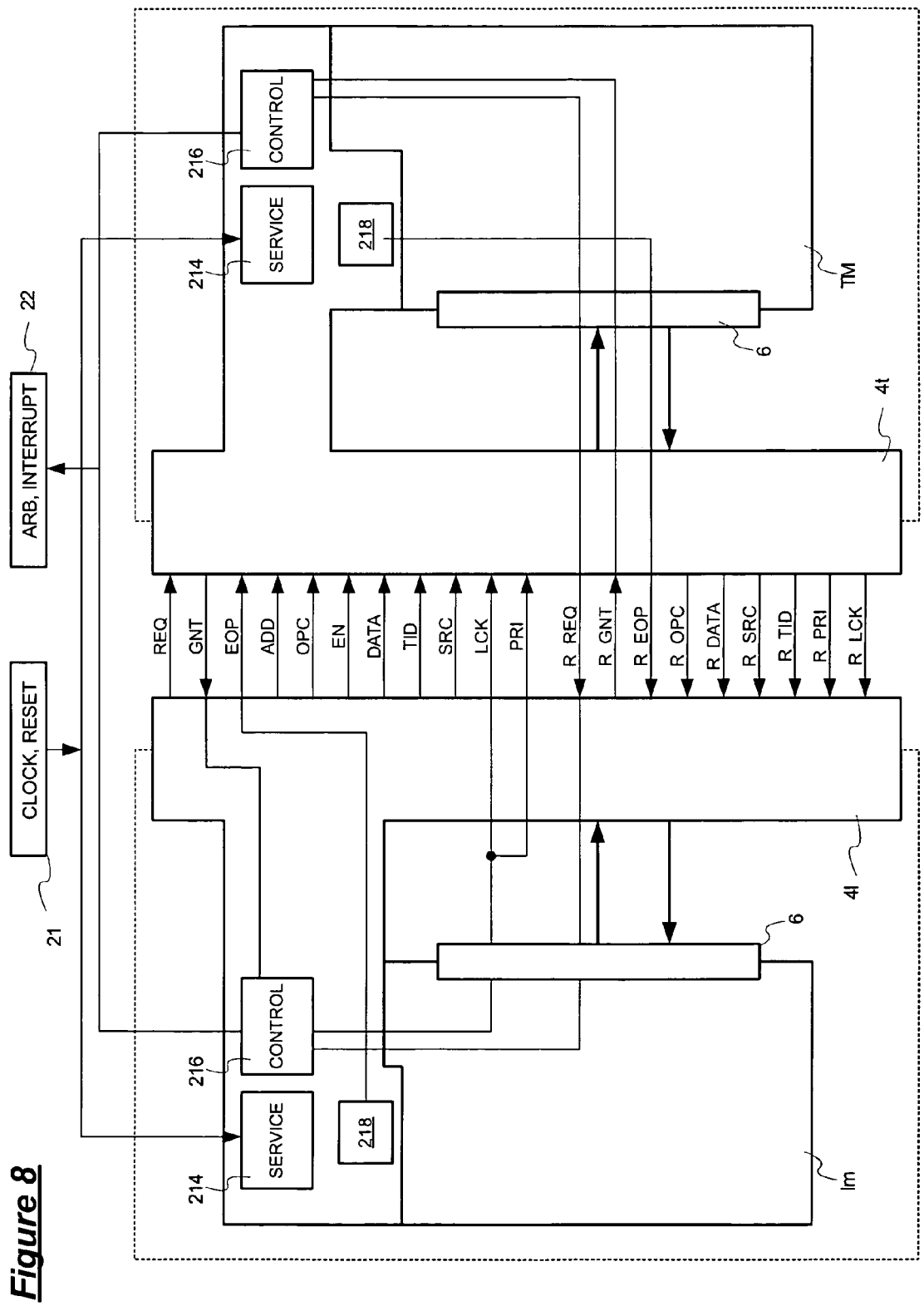

FIG. 8 illustrates a Type III port which provides similar functionality at the initiator interface to the Type II port, but has increased functionality on the target side. This is indicated in particular by the ability to have response priority arbitration according to the r_pri signal, response transaction information, and a response lock signal r_lck.

Figure 9:
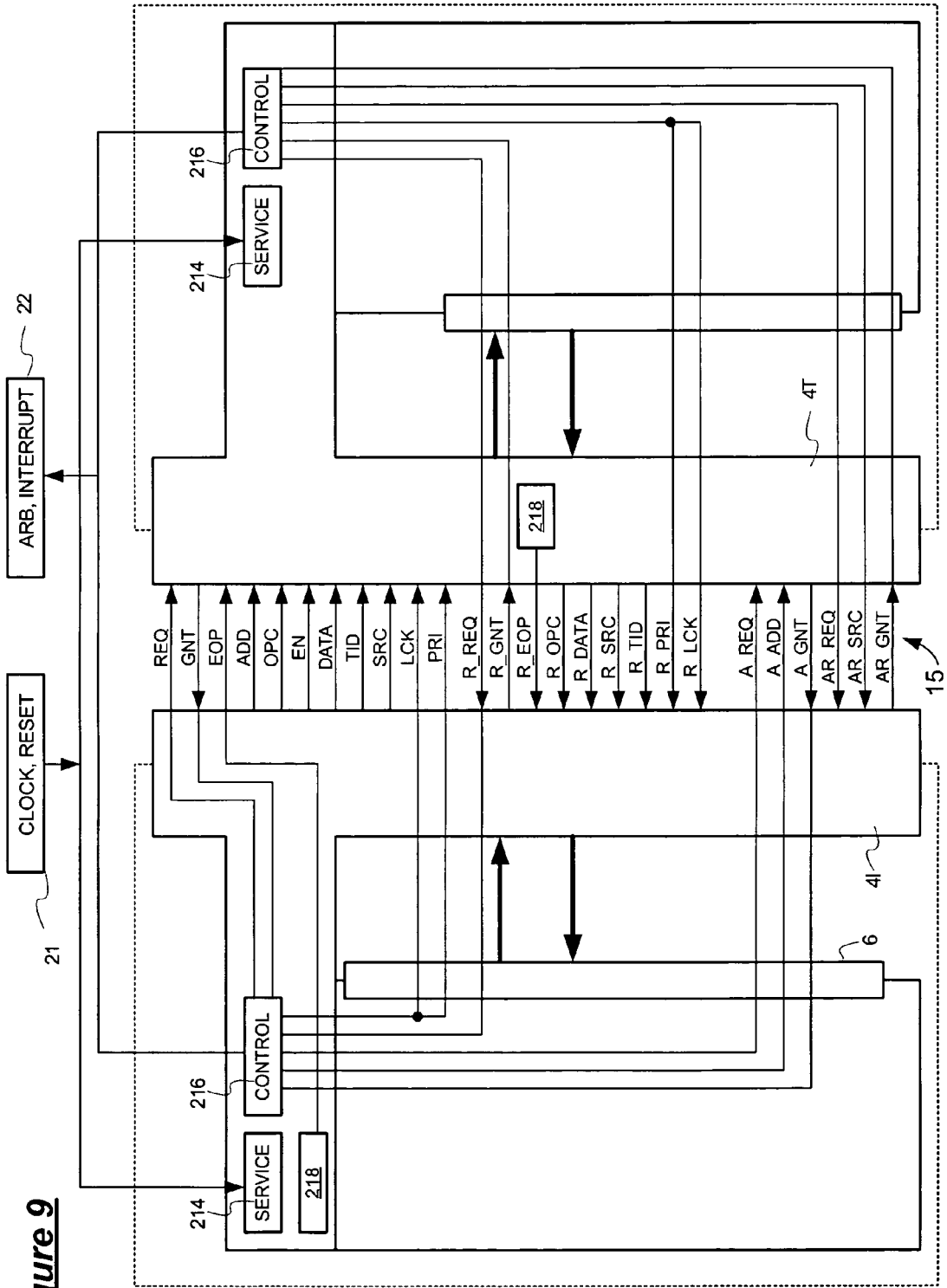

FIG. 9 illustrates the Type IV port which has similar functionality to the Type III port but in addition is able to support pipelined arbitration on both the initiator and target sides. The packet protocol described herein allows all of these different types of ports to be connected to a common packet router 15. This is achievable by designing each of the more advanced ports by adding signals to a base set of signals utilized in the simpler ports.

Figure 10:
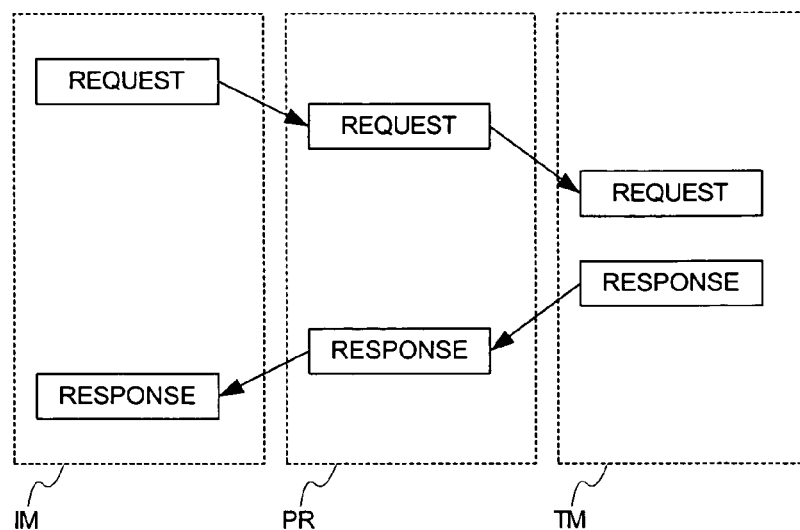
FIG. 10 illustrates a primitive memory access operation.

In order to better understand the enhanced functions of the Type III port, reference is made to FIG. 10 to describe a complete transaction. In FIG. 10, IM denotes an initiator module, TM denote a target module and PR denotes the packet router or routing bus 15.

A transaction is initiated by forming a request packet at the initiator module. The request packet is placed onto the packet router 15 by the initiator port associated with the initiator module IM and is conveyed by the packet router 15 to the target module defined in the destination field of the request packet. The memory access operation requested in the request packet is implemented and a response packet is formulated by the target module, placed on the packet router via the port associated with the target module and returned to the initiator module. Only then is a transaction deemed to be completed. FIG. 10 illustrates a so-called primitive transaction made up of a single request and response. Each request packet carries a unique transaction indicator which identifies that transaction by a number generated by the initiator module. This will be termed herein the transaction number. When the response packet is formulated at the target module TM, it contains the same transaction number as that conveyed by the request packet. Thus, when the response packet is received at the initiator module, the transaction number conveyed by the response can be matched to the transaction number of the initial request to confirm that the transaction has been completed. Each request packet generated by a particular initiator module has a unique transaction number.

Figure 11:
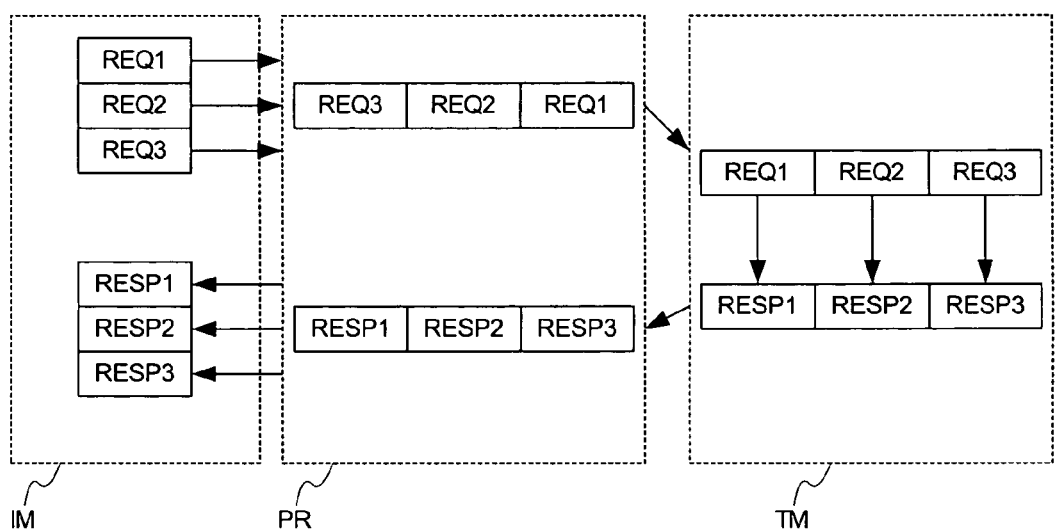
FIG. 11 illustrates a compound memory access operation.

The system described herein also supports so-called compound transactions. A compound transaction involves multiple request/response packets. This is illustrated diagrammatically in FIG. 11. It is assumed for the purposes of the example of FIG. 11 that this particular compound transaction involves the issuance of three request packet REQ1, REQ2, REQ3 by the initiator module. These request packets are transmitted via the packet router 15 to the target module. The arbitration module 22 uses the lock signals to control the packet flow across the packet router to ensure that all three request packets are conveyed from the initiator module to the target module without interruption. As each request packet reaches the target module, a respective response packets REP1, REP2, REP3 is generated and conveyed by the packet router 15 to the initiator module. Each of the request packets REQ1, REQ2, REQ3 has the same transaction number which is returned in the response packets. The fact that the transaction is a compound transaction is conveyed by the lock signal. When the lock signal is not asserted, the transaction has no relationship with the next transaction (end of message). When the lock signal is asserted, this indicates that the next transaction is related to this transaction (part of a message).

The arbitration mechanism will now be described with reference to FIG. 12, FIG. 13a and FIG. 13b in order to explain the function of the additional arbitration signals supported by the Type IV port. FIG. 12 is a schematic block diagram of the arbitration unit 22. It comprises decision making logic 13, a decision queue 15 having a plurality of decision locations 15a, transfer logic 19 and a control block 21 which controls the functions of the arbitration unit. The signals which go into and leave the arbitration unit 22 are also shown schematically in FIG. 12 indicating the block to which they refer. The decision making logic makes arbitration decisions according to any suitable arbitration algorithm. An arbitration decision is made responsive to receipt of the arbitration request a-req together with the destination byte 73 (a_add) of a packet generated in the functional module which made the arbitration request. Once the arbitration decision has been made, it is placed on a queue 15 in a decision location 15a and the handshake control signal a_gnt is issued indicating that a subsequent arbitration request may be received. Each arbitration decision held in the queue 15 identifies the requesting module (src) 99, the packet destination (destination byte 73 a_add) and any end of packet (eop) signal. The transfer logic 19 implements a transfer responsive to assertion of the request signal req of the initiator port and the grant signal gnt of the target port by placing the packet on the bus 15.

While the transfer logic 19 is implementing a transfer, an arbitration decision can be effected by the decision logic 13 for a later packet. Protocol can determine that a deferred arbitration decision can be made a fixed number of cycles after a current request. The capacity of the queue 15 in the arbitration unit 22 matches this delay or latency to hold the requisite number of decisions awaiting transfer.

FIG. 13a illustrates the effective transfer of packets from a destination to a source module across the routing bus 15. The request signal req indicates that a function module has requested a transfer, and the grant signal gnt indicates that the destination module is able to receive the transfer. The address signal 63 (add) indicates the location within the target module to which the packet is addressed. That is, it is the part of the address illustrated in FIG. 4 which identifies the destination location within the target module. The destination of the target module itself, indicated by the dest byte 73 forms the signal a_add in FIG. 13b. FIG. 13b also illustrates the arbitration request signal a_req indicating that a request for arbitration has been made by an initiator port. The arbitration grant signal a_gnt is asserted by the arbitration unit 22 when each arbitration decision has been made. At time t0, an arbitration request a_req is made by an initiator port and the destination byte 73 a_add of the address is supplied with the arbitration request. When the arbitration decision has been made at time t1, the arbitration grant signal a_gnt is asserted which acts as a handshake control to the port which issued the arbitration request to indicate that an arbitration decision has been made and that its packet is ready for transfer. The time between t0 and t1 is a decision cycle time. Once the decision has been made, it is queued in the queue 15 ready to be implemented as a transfer. In order to implement the transfer, the port raises the request signal req and supplies the destination byte 73 (add). When the grant signal gnt of the target port is asserted at time t3 the transfer can be implemented. During that transfer, the decision logic 13 has not been idle. A subsequent destination address for a second packet REQ2 was supplied by the functional module at time t4 while asserting the arbitration request a_req. The arbitration decision was made one decision cycle later and the arbitration grant signal asserted at time t5. That arbitration decision was placed in the queue whilst the transfer logic 19 was implementing the transfer of the first request REQ1. A subsequent request, REQ3 was also the subject of an arbitration decision during the transfer time of the first request REQ1. That decision is also placed on the queue 15. By the time the arbitration decision for the third request has been implemented, the transfer mechanism is ready to transfer a subsequent packet. Thus, at time t6 there are two decisions in the queue, REQ2, REQ3. REQ1 has been transferred and REQ2 is awaiting transfer from the queue. When the request signal req is next asserted by an initiator port at time t6 and the subsequent grant signal from the target module is asserted, then the transfer of the second request REQ2 can take place. This can coincide with the making of a subsequent arbitration decision for a fourth request, REQ4. Thus, the latency of arbitration decisions can be hidden by overlapping with the transfer time.

Although the sequence has been described for module M1 as though it is an initiator module making a request to transmit a request packet, a similar sequence of events takes place for the transmission of response packets from a target module. This involves the assertion of a response request signal r_req, together with transmission of the src byte indicating the destination of the response packet (being the initiator module). A response grant signal r_gnt is asserted by the initiator module when it is ready to receive a response.

What is claimed is:

1. A method for operating a target port for a functional module in an integrated circuit system, the method comprising:
   receiving a plurality of request packets from a packet router of the integrated circuit system at a single input buffer wherein each request packet is uniquely identified by a transaction number and wherein the plurality of request packets are received in a first order;
   selecting one or more request packets from amongst the plurality of request packets in the input buffer for supply to the functional module to implement an operation defined in the request packet in a second order, the second order being independent of the first order when the request packets were received by the single input buffer;
   determining whether each selected request packet forms part of a simple transaction involving a single request packet or a compound transaction involving at least two of the plurality of request packets including a first request packet and a last request packet; and
   generating and retrieving a response packet for each of the selected one or more request packets in a third order independent of the second order in which the request packets were selected, wherein in the case of a compound transaction, causing a lock signal to be supplied for all request packets involved in the compound transaction save the last packet, and wherein a response lock signal is set with responses generated responsive to said request packets forming part of said compound transaction.

2. The method of claim 1 wherein each request packet includes an indicator of a source of the packet and a transaction identifier uniquely identifying the transaction in which the packet is engaged and wherein the response packets use the source identifier as a destination indicator for identifying the destination of the response packet, and also convey said unique transaction identifier.

3. The method of claim 1 further comprising:
   buffering the plurality of request packet within the target port.

4. The method of claim 1 further comprising:
   buffering in an output buffer a plurality of response packets within the target port, wherein each response packet corresponds to a particular request packet.

5. The method of claim 4 wherein when it is determined that the selected request packet forms part of a compound transaction the plurality of response packets are associated with the compound transaction, including a first response packet and a subsequent response packet.

6. The method of claim 5 further comprising:
   generating an arbitration request associated with the subsequent response packet while at the same time generating a transfer request in relation to the first packet held in the output buffer.

7. A method for conducting transactions in an integrated circuit having a plurality of functional modules coupled by a packet router, wherein some of the functional modules operate as initiators for a particular transaction and others of the functional modules operate as targets for the particular transaction, the method comprising:
   selecting one or more request packets from amongst a plurality of request packets in a single input buffer for supply to at least one of the plurality of functional modules in a first order independent of a second order when the one or more request packets were received at the single input buffer wherein each request packet is uniquely identified by a transaction number;
   determining whether each of the selected request packets forms part of a simple transaction involving a single request packet or a compound transaction involving two or more of the plurality of request packets including a first request packet and a last request packet;
   generating a lock signal indicating that a request packet forms part of a compound transaction involving a plurality of request packets; and
   in response to the lock signal, generating a response lock signal when a response packet is generated responsive to a request packet in which the lock signal was set wherein the response packet is generated and retrieved in a third order, the third order being independent of the first order the one or more request packets were selected from the single input buffer.

8. The method of claim 7 wherein the lock signal is generated by an initiator functional module and conveyed to a target functional module.

9. The method of claim 7 further comprising conveying priority information concerning response packets from the target functional module.

10. The method of claim 7 further comprising associating request packets and response packets that form part of a compound transaction using a transaction identifier value in the request and response packets.

11. A method for arbitrating access to a packet router from a plurality of functional modules coupled to the packet router, wherein some of the functional modules operate as initiators for a particular transaction and others of the functional modules operate as targets for the particular transaction, the method comprising:

selecting one or more packets from amongst a plurality of packets in a single input buffer for supply to at least one of the plurality of functional modules in a first order independent of a second order of when the request packets were received at the single input buffer wherein each request packet is uniquely identified by a transaction number;

determining whether each of the selected packets forms part of a simple transaction involving a single packet or a compound transaction involving two or more of the plurality of packets;

generating a lock signal indicating that a packet forms part of a compound transaction involving a plurality of request packets; and in response to the lock signal, generating a response lock signal when a response packet is generated responsive to a packet in which the lock signal was set wherein the response packet is generated and retrieved in a third order independent of the second order in which the one or more request packets were selected from the single input buffer.

12. The method of claim 11 further comprising conveying priority information concerning response packets from the target functional module.

13. The method of claim 11 further comprising associating request packets and response packets that form part of a compound transaction using a transaction identifier value in the request and response packets.

14. The method of claim 11 further comprising using the lock signal and the response lock signal to control packet flow across the packet router to ensure that all request packets that belong to a particular compound transaction are conveyed from the initiator module to the target module without interruption.

\* \* \* \* \*